(12) United States Patent
Priddy

(10) Patent No.: US 6,523,238 B1
(45) Date of Patent: Feb. 25, 2003

(54) BRAKE CALIPER DEPRESSOR DEVICE

(76) Inventor: Thomas O. Priddy, 206 1/2 S. 11th St., Las Vegas, NV (US) 89101

( * ) Notice: Subject to any disclaimer, the term of this patent is extended or adjusted under 35 U.S.C. 154(b) by 6 days.

(21) Appl. No.: 09/853,491

(22) Filed: May 11, 2001

(51) Int. Cl.[7] .................................................. B23P 19/04
(52) U.S. Cl. ......................................... 29/239; 29/266
(58) Field of Search ..................... 29/239, 266; 269/6; 254/108

(56) References Cited

U.S. PATENT DOCUMENTS

| | | |
|---|---|---|
| 3,705,581 A | 12/1972 | Drake |
| 4,086,828 A | 5/1978 | Mader |
| 4,903,391 A | 2/1990 | Franks |
| 5,018,261 A * | 5/1991 | Markous ........................ 29/239 |
| D354,208 S | 1/1995 | Vega |
| 5,678,293 A | 10/1997 | Sturdevant |
| 6,134,764 A * | 10/2000 | Rivera ........................ 29/239 |

* cited by examiner

Primary Examiner—Robert C. Watson

(57) ABSTRACT

A brake caliper depressor device for pushing back disc brake caliper pistons when installing new brake pads. The brake caliper depressor device includes a gun assembly including a main portion and a barrel portion connected to the main portion and also including a trigger mechanism being attached to the main portion; and also includes a push rod member being movably disposed through the gun member and having a first end and a second end; and further includes a plurality of caliper piston engagement members being attached to the second end of the push rod member.

19 Claims, 2 Drawing Sheets

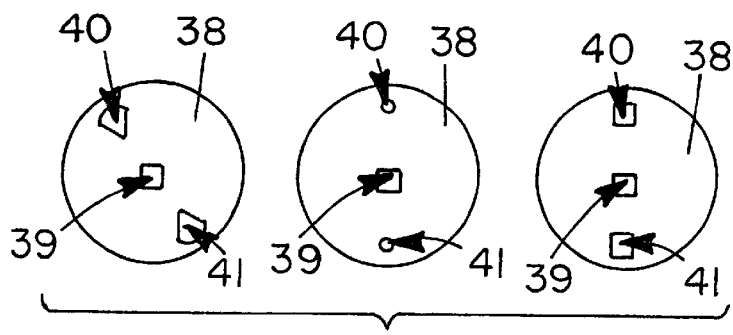
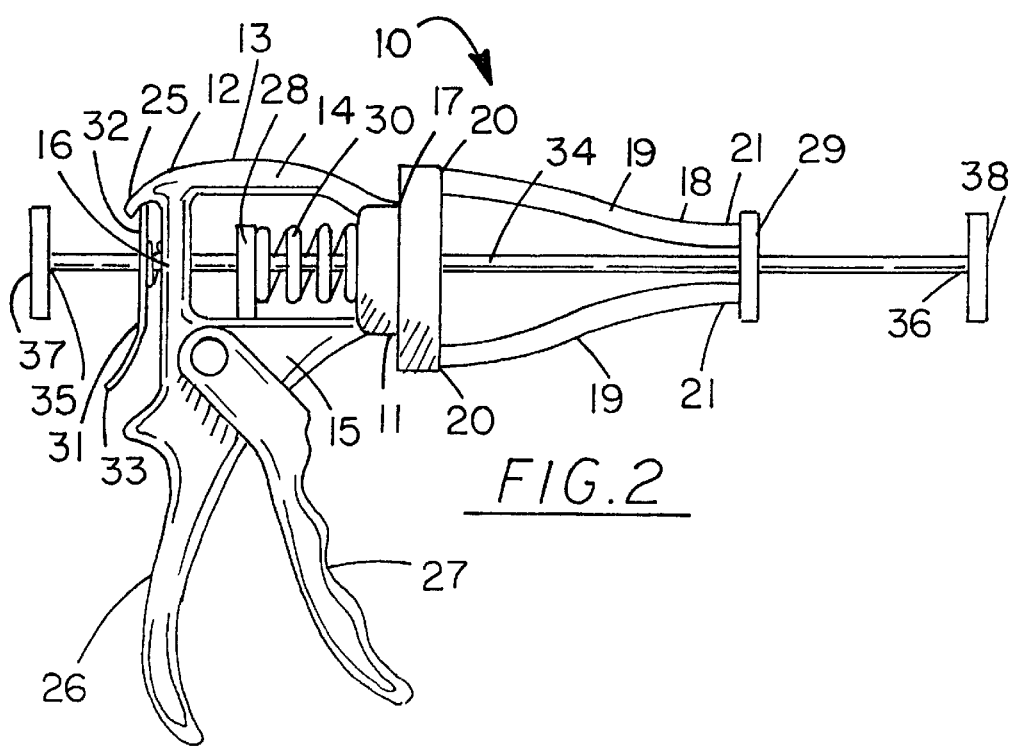

BRAKE CALIPER DEPRESSOR DEVICE

BACKGROUND OF THE INVENTION

1. Field of the Invention

The present invention relates to caliper piston depressors and more particularly pertains to a new brake caliper depressor device for pushing back disc brake caliper pistons when installing new brake pads.

2. Description of the Prior Art

The use of caliper piston depressors is known in the prior art. More specifically, caliper piston depressors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,903,391; U.S. Pat. No. 5,018,261; U.S. Pat. No. 3,705,581; U.S. Pat. No. 4,086,828; U.S. Pat. No. 5,678,293; and U.S. Pat. No. Des. 354,208.

While these devices fulfill their respective, particular objectives and requirements, the aforementioned patents do not disclose a new brake caliper depressor device. The inventive device includes a gun assembly including a main portion and a barrel portion connected to the main portion and also including a trigger mechanism being attached to the main portion; and also includes a push rod member being movably disposed through the gun member and having a first end and a second end; and further includes a plurality of caliper piston engagement members being attached to the second end of the push rod member.

In these respects, the brake caliper depressor device according to the present invention substantially departs from the conventional concepts and designs of the prior art, and in so doing provides an apparatus primarily developed for the purpose of pushing back disc brake caliper pistons when installing new brake pads.

SUMMARY OF THE INVENTION

In view of the foregoing disadvantages inherent in the known types of caliper piston depressors now present in the prior art, the present invention provides a new brake caliper depressor device construction wherein the same can be utilized for pushing back disc brake caliper pistons when installing new brake pads.

The general purpose of the present invention, which will be described subsequently in greater detail, is to provide a new brake caliper depressor device which has many of the advantages of the caliper piston depressors mentioned heretofore and many novel features that result in a new brake caliper depressor device which is not anticipated, rendered obvious, suggested, or even implied by any of the prior art caliper piston depressors, either alone or in any combination thereof.

To attain this, the present invention generally comprises a gun assembly including a main portion and a barrel portion connected to the main portion and also including a trigger mechanism being attached to the main portion; and also includes a push rod member being movably disposed through the gun member and having a first end and a second end; and further includes a plurality of caliper piston engagement members being attached to the second end of the push rod member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new brake caliper depressor device which has many of the advantages of the caliper piston depressors mentioned heretofore and many novel features that result in a new brake caliper depressor device which is not anticipated, rendered obvious, suggested, or even implied by any of the prior art caliper piston depressors, either alone or in any combination thereof.

It is another object of the present invention to provide a new brake caliper depressor device which may be easily and efficiently manufactured and marketed.

It is a further object of the present invention to provide a new brake caliper depressor device which is of a durable and reliable construction.

An even further object of the present invention is to provide a new brake caliper depressor device which is susceptible of a low cost of manufacture with regard to both materials and labor, and which accordingly is then susceptible of low prices of sale to the consuming public, thereby making such brake caliper depressor device economically available to the buying public.

Still yet another object of the present invention is to provide a new brake caliper depressor device which provides in the apparatuses and methods of the prior art some of the advantages thereof, while simultaneously overcoming some of the disadvantages normally associated therewith.

Still another object of the present invention is to provide a new brake caliper depressor device for pushing back disc brake caliper pistons when installing new brake pads.

Yet another object of the present invention is to provide a new brake caliper depressor device which includes a gun assembly including a main portion and a barrel portion connected to the main portion and also including a trigger mechanism being attached to the main portion; and also includes a push rod member being movably disposed through the gun member and having a first end and a second end; and further includes a plurality of caliper piston engagement members being attached to the second end of the push rod member.

Still yet another object of the present invention is to provide a new brake caliper depressor device that is easy and convenient to use.

Even still another object of the present invention is to provide a new brake caliper depressor device that saves the user substantial amount of time when installing new brake pads.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevational view of the present invention.

FIG. 3 is a front elevational view of the caliper piston engagement members of the present invention.

DESCRIPTION OF THE PREFERRED EMBODIMENT

Figure 1:
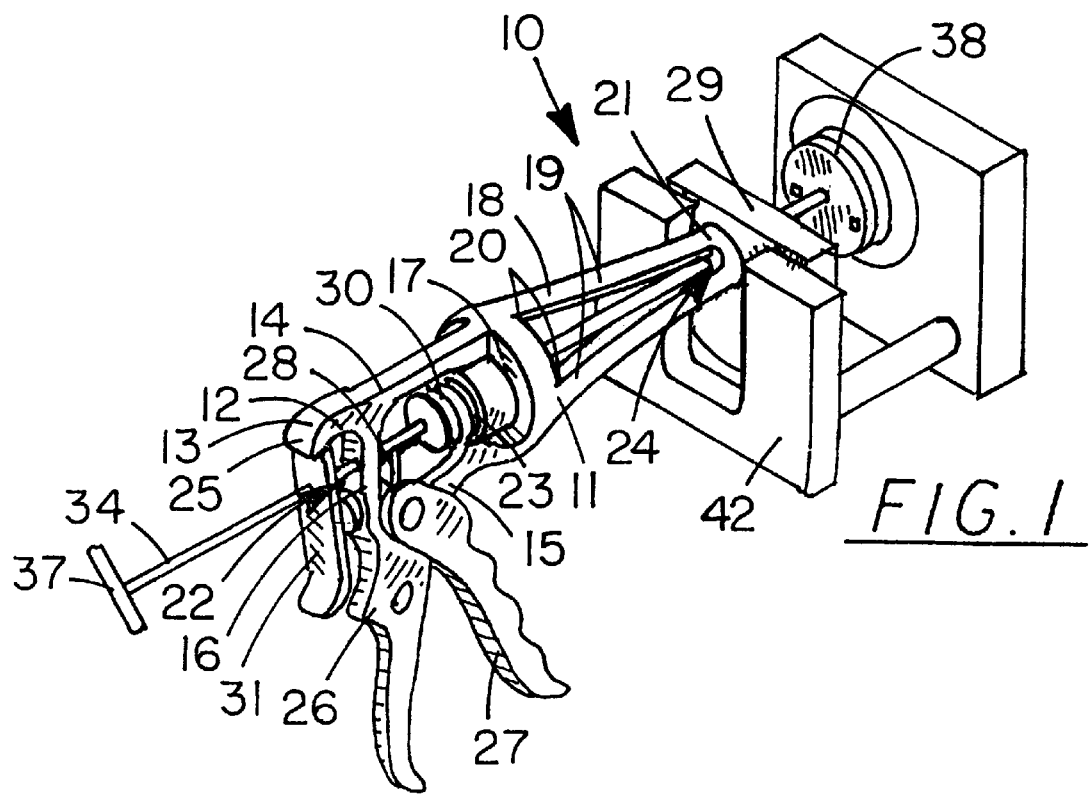
FIG. 1 is a perspective view of a new brake caliper depressor device according to the present invention and shown in use.

With reference now to the drawings, and in particular to FIGS. 1 through 3 thereof, a new brake caliper depressor device embodying the principles and concepts of the present invention and generally designated by the reference numeral 10 will be described.

As best illustrated in FIGS. 1 through 3, the brake caliper depressor device 10 generally comprises a gun assembly 11 including a main portion 12 and a barrel portion conventionally connected to the main portion 12 and also includes a trigger mechanism being conventionally attached to the main portion 12. The main portion 12 includes a first frame 13 having an elongate top member 14, an elongate bottom member 15, a back support member 16 conventionally interconnecting the elongate top and bottom members 14,15. A front support member 17 also conventionally interconnects the elongate top and bottom members 14,15. The back and front support members 14,15 have holes 22,23 disposed therethrough. The elongate top member 14 has a curved end portion 25. The barrel portion includes a second frame 18 having a plurality of arm members 19 having first ends 20 being securely and conventionally attached to the front support member 17, and also having second ends 21 which are conventionally interconnected to one another and which have a hole 24 extending therethrough. The gun assembly 11 further includes an abutment member 29 being securely and conventionally attached to the second ends 21 of the arm members 19 and having a hole disposed therethrough and being adapted to abut against a portion of a brake caliper 42. The trigger mechanism includes a handle portion 26 conventionally extending from the elongate bottom member 15, and also includes a lever 27 being hingedly attached to the handle portion 26, and further includes a push rod engagement member 28 being conventionally attached to the lever 27 and having an end portion being disposed between the elongate top and bottom members 14,15 of the first frame 13. The gun assembly also includes a spring 30 being disposed between the front support member 17 and the push rod engagement member 28.

A push rod member 34 is movably disposed through the gun member 11 and has a first end 35 and a second end 36. The push rod member 34 movably extends through the holes 22–24 of the gun assembly 11 and has a handle portion 37 at the first end 35 thereof. The push rod member 34 also movably extends through the end portion of the push rod engagement member 28. The gun assembly 11 further includes a push rod release member 31 being pivotally attached to the back support member 16 and having a first end 32 which is engagable to the curved end portion 25 of the elongate top member 14 and having a curved second end portion 33. The push rod member 34 is movably engaged through the push rod release member 31. A plurality of caliper piston engagement members 38 are interchangeably attached to the second end 36 of the push rod member 34. Each of the caliper piston engagement members 38 is disc-shaped and has a centrally-disposed hole 39 therethrough and also has diametrically-opposed openings 40,41 disposed therethrough near a perimeter thereof. The centrally-disposed hole 39 removably receives the second end 36 of the push rod member 34. The caliper piston engagement members 38 are adapted to engage particular caliper pistons.

In use, the user places the abutment member 29 against the brake caliper 42 and places the caliper piston engagement member 38 against the caliper piston or pistons and pulls on the lever 27 to urge the push rod member 34 toward the caliper piston or pistons to force the caliper pistons back into place after having replaced the disc brake pads. Once finished, the user simply presses on the curved second portion 33 of the push rod release member 31 to allow the spring 30 to release the push rod member 34.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A brake caliper depressor device comprising:

a gun assembly including a main portion and a barrel portion connected to said main portion and also including a trigger mechanism being attached to said main portion;

a push rod member being movably disposed through said gun member and having a first end and a second end; and a plurality of caliper piston engagement members, each of said plurality of caliper piston engagement members being individually attachable to said second end of said push rod member;

wherein said main portion includes a first frame having an elongate top member, an elongate bottom member, a back support member interconnecting said elongate top and bottom members, a front support member also interconnecting said elongate top and bottom members, said back and front support members having holes therethrough, said elongate top member having a curved end portion.

2. A brake caliper depressor device as described in claim 1, wherein said barrel portion includes a second frame having a plurality of arm members having first ends being securely attached to said front support member, and also having second ends which are interconnected to one another and which have a hole extending therethrough.

3. A brake caliper depressor device as described in claim 2, wherein said gun assembly further includes an abutment member being securely attached to said second ends of said arm members and having a hole therethrough and being adapted to abut against a portion of a brake assembly.

4. A brake caliper depressor device as described in claim 1, wherein said trigger mechanism includes a handle portion extending from said elongate bottom member, and also includes a lever being hingedly attached to said handle portion, and further includes a push rod engagement member being attached to said lever and having an end portion being disposed between said elongate top and bottom members of said first frame.

5. A brake caliper depressor device as described in claim 4, wherein said gun assembly also includes a spring being, disposed between said front support member and said push rod engagement member.

6. A brake caliper depressor device as described in claim 5, wherein said push rod member movably extends through said holes of said gun assembly and has a handle portion at said first end thereof, said push rod member also movably extending through said end portion of said push rod engagement member.

7. A brake caliper depressor device as described in claim 1, wherein said gun assembly further includes a push rod release member being pivotally attached to said back support member and having a first end which is engagable to said curved end portion of said elongate top member and having a curved second end portion, said push rod member being movably engaged through said push rod release member.

8. A brake caliper depressor device as described in claim 1, wherein each of said caliper piston engagement members is disc-shaped and has a centrally-disposed hole therethrough and also has diametrically-opposed openings disposed therethrough near a perimeter thereof, said centrally-disposed hole removably receiving said second end of said push rod member, said caliper piston engagement members being adapted to engage particular caliper pistons.

9. A brake caliper depressor device comprising:

a gun assembly including a main portion and a barrel portion connected to said main portion and also including an actuating trigger mechanism being attached to said main portion, said main portion including a first frame having an elongate top member, an elongate bottom member, a back support member interconnecting said elongate top and bottom members, a front support member also interconnecting said elongate top and bottom members, said back and front support members having holes therethrough, said elongate top member having a curved end portion, said barrel portion including a second frame having a plurality of arm members having first ends being securely attached to said front support member, and also having second ends which are interconnected to one another and which have a hole extending therethrough, said gun assembly further including an abutment member being securely attached to said second ends of said arm members and having a hole therethrough and being adapted to abut against a portion of a brake assembly, said actuating trigger assembly including a handle portion and a lever member that is pivotable with respect to the handle portion and positioned with respect to said handle portion such that said handle portion and said lever are graspable by a single hand of the user and said handle portion and said lever are movable towards each other by moving fingers of the user toward the palm of the hand of the user, said lever being operationally coupled to said push rod member such that pivoting movement of said lever causes movement of said push rod member with respect to said main portion, said actuating trigger mechanism including a push rod engagement member being attached to said lever and having an end portion being disposed between said elongate top and bottom members of said first frame, said gun assembly also including a spring being disposed between said front support member and said push rod engagement member;

a push rod member being movably disposed through said gun member and having a first end and a second end, said push rod member movably extending through said holes of said gun assembly and having a handle portion at said first end thereof, said push rod member also movably extending through said end portion of said push rod engagement member, said gun assembly further including a push rod release member being pivotally attached to said back support member and having a first end which is engagable to said curved end portion of said elongate top member and having a curved second end portion, said push rod member being movably engaged through said push rod release member; and a plurality of caliper piston engagement members, each of said plurality of caliper piston engagement members being individually attachable to said second end of said push rod member, each of said caliper piston engagement members being disc-shaped and having a centrally-disposed hole therethrough and also having diametrically-opposed openings disposed therethrough near a perimeter thereof, said centrally-disposed hole removably receiving said second end of said push rod member, said caliper piston engagement members being adapted to engage particular caliper pistons.

10. A brake caliper depressor device comprising:

a gun assembly including a main portion, a barrel portion connected to said main portion, and an actuating trigger mechanism attached to said main portion;

a push rod member being movably disposed through said gun member and having a first end and a second end; and at least one caliper piston engagement members removably attachable to said second end of said push rod member;

wherein said actuating trigger assembly includes a handle portion and a lever member that is pivotable with respect to the handle portion and positioned with respect to said handle portion such that said handle portion and said lever are graspable by a single hand of the user and said handle portion and said lever are movable towards each other by moving fingers of the user toward the palm of the hand of the user, said lever being operationally coupled to said push rod member such that pivoting movement of said lever causes movement of said push rod member with respect to said main portion.

11. A brake caliper depressor device as described in claim 10, wherein said main portion includes a first frame comprising:

an elongate top member;

an elongate bottom member;

a back support member interconnecting said elongate top and bottom members; and a front support member interconnecting said elongate top and bottom members;

wherein said back and front support members have holes therethrough, said elongate top member having an end portion.

12. A brake caliper depressor device as described in claim 11, wherein said barrel portion includes a second frame comprising a plurality of arm members having first ends attached to said front support member and second ends interconnected to one another, said second ends defining a hole.

13. A brake caliper depressor device as described in claim 12, wherein said gun assembly further includes an abutment member for abutting against a portion of a brake assembly, said abutment member being attached to said second ends of said arm members, said abutment member having a hole therethrough.

14. A brake caliper depressor device as described in claim 11, wherein said actuating trigger mechanism includes a push rod engagement member being attached to said lever and having an end portion being disposed between said elongate top and bottom members of said first frame.

15. A brake caliper depressor device as described in claim 14, wherein said gun assembly also includes a spring being disposed between said front support member and said push rod engagement member.

16. A brake caliper depressor device as described in claim 15, wherein said push rod member movably extends through said holes of said gun assembly and has a handle portion at said first end thereof, said push rod member also movably extending through said end portion of said push rod engagement member.

17. A brake caliper depressor device as described in claim 11, wherein said gun assembly further includes a push rod release member being pivotally attached to said back support member and having a first end which is engagable to said end portion of said elongate top member, said push rod member being movably engaged through said push rod release member.

18. A brake caliper depressor device as described in claim 10, wherein at least one said caliper piston engagement member is disc-shaped, said engagement member having a centrally-disposed hole therethrough, said engagement member having diametrically-opposed openings disposed therethrough near a perimeter thereof, said centrally-disposed hole removably receiving said second end of said push rod member.

19. A brake caliper depressor device as described in claim 10, additionally comprising a plurality of said caliper piston engagement members.

* * * * *